US011311955B2

(12) United States Patent
Maradia et al.

(10) Patent No.: US 11,311,955 B2
(45) Date of Patent: Apr. 26, 2022

(54) METHOD AND DEVICE FOR MACHINING SHAPES USING ELECTRICAL MACHINING

(71) Applicant: Agie Charmilles SA, Losone (CH)

(72) Inventors: Umang Maradia, Locarno (CH); Mikhail Kliuev, Zürich (CH)

(73) Assignee: Agie Charmilles SA

( * ) Notice: Subject to any disclaimer, the term of this patent is extended or adjusted under 35 U.S.C. 154(b) by 297 days.

(21) Appl. No.: 16/177,488

(22) Filed: Nov. 1, 2018

(65) Prior Publication Data
US 2019/0151972 A1  May 23, 2019

(30) Foreign Application Priority Data
Nov. 20, 2017  (EP) .................... 17 202 531

(51) Int. Cl.
*B23H 9/00* (2006.01)
*B23H 9/14* (2006.01)
*B23H 1/00* (2006.01)
*B23H 7/26* (2006.01)
*B23H 9/10* (2006.01)

(52) U.S. Cl.
CPC ............... *B23H 9/14* (2013.01); *B23H 9/00* (2013.01); *B23H 1/00* (2013.01); *B23H 7/26* (2013.01); *B23H 9/10* (2013.01)

(58) Field of Classification Search
CPC ......... B23H 9/14; B23H 1/00; F01D 2220/32; F01D 2230/10; F01D 2240/305; F01D 2240/306
See application file for complete search history.

(56) References Cited

U.S. PATENT DOCUMENTS

| | | | | |
|---|---|---|---|---|
| 5,360,957 A | * | 11/1994 | Haefner | B23H 1/02 219/69.13 |
| 8,286,348 B2 | * | 10/2012 | Rozic | F01D 5/34 29/889.23 |
| 2006/0138092 A1 | * | 6/2006 | Chen | B23H 7/18 219/69.13 |
| 2006/0231530 A1 | * | 10/2006 | Beaumont | B23H 9/14 219/69.15 |
| 2009/0143885 A1 | * | 6/2009 | Grant | B23H 7/20 700/97 |
| 2012/0116722 A1 | * | 5/2012 | Yousfi-Steiner | G06K 9/00536 702/185 |
| 2013/0213941 A1 | * | 8/2013 | Asai | B23H 1/02 219/69.11 |
| 2016/0193667 A1 | * | 7/2016 | Luketic | B23P 15/04 29/558 |
| 2016/0333697 A1 | * | 11/2016 | Steinert | F01D 5/146 |

(Continued)

FOREIGN PATENT DOCUMENTS

| | | |
|---|---|---|
| EP | 0616868 A1 | 9/1994 |
| EP | 3135866 A1 | 3/2017 |

(Continued)

*Primary Examiner* — John J Norton
*Assistant Examiner* — Simpson A Chen
(74) *Attorney, Agent, or Firm* — Harness, Dickey & Pierce, P.L.C.

(57) ABSTRACT

The invention provides a method for machining a shape such as slot or cavity or aperture using a plurality of first type holes (1) and second type holes (2), wherein during machining of first type holes (1) the hole circumference completely envelopes the respective portion of the electrode circumference.

17 Claims, 8 Drawing Sheets

(56) References Cited

U.S. PATENT DOCUMENTS

2017/0235289 A1* 8/2017 Kayanuma ........... G05B 19/402
                                                    700/187
2019/0143431 A1* 5/2019 Luo ........................ B23H 7/26
                                                    219/69.15

FOREIGN PATENT DOCUMENTS

KR      20110048720 A    5/2011
WO   WO-2013/074165 A2   5/2013

* cited by examiner

METHOD AND DEVICE FOR MACHINING SHAPES USING ELECTRICAL MACHINING

CROSS-REFERENCE TO RELATED APPLICATIONS

This application claims the benefit and priority of European Application No. 17202531.4, filed Nov. 20, 2017. The entire disclosure of the above application is incorporated herein by reference.

FIELD OF THE INVENTION

This invention relates to a method of machining shapes such as slot or cavity or aperture by means of electric machining, in particular electric discharge machining.

BACKGROUND OF THE INVENTION

Electrical discharge machining (EDM) is a widely used process for machining of difficult to cut materials, typically electrically conductive. The low process forces and the process nature make it suitable to machine high aspect ratio structures, high precision features, sharp corners or polygonal cavities and free-form surfaces. EDM is especially a competitive technology for slot machining which often involve narrow and deep grooves, e.g. in mold making, for generating ribs on the polymer parts or for machining of seal slots in turbine components.

Focusing on the seal slots for turbines, it is generally known and as mentioned by EP3135866A1, leakage of hot combustion gases and/or cooling flows between turbomachinery components generally causes reduced power output and lower efficiency. For example, hot combustion gases may be contained within a turbine by providing pressurized compressor air around a hot gas path. Typically, leakage of high pressure cooling flows between adjacent turbine components (such as stator shrouds, nozzles, and diaphragms, inner shell casing components, and rotor components) into the hot gas path leads to reduced efficiency and requires an increase in burn temperature, and a decrease in engine gas turbine efficiency to maintain a desired power level as compared to an environment void of such leakage. Turbine efficiency thus can be improved by reducing or eliminating leakage between turbine components. Traditionally, leakage between turbine component junctions is treated with metallic seals positioned in the seal slots formed between the turbine components, such as stator components. Seal slots typically extend across the junctions between components such that metallic seals positioned therein block or otherwise inhibit leakage through the junctions. Seal slots are typically long narrow grooves made to accommodate a metal sheet/strip seal or other seal materials including coated seal system (EP3135866A1). According to WO2013074165A2 sealing is often accomplished using spline seals which are small metallic strips that bridge the gaps between adjacent shroud segments. Multiple spline seals are often positioned in axial and radial directions, in intersecting slots. In order to reduce leakage at the interface of two perpendicular seals, a seal with an L-shape (an "L-seal") is sometimes used in order to dead-end chute flow in the seal slots.

A traditional cutting process such as milling or grinding would be less effective or suitable due to the required small cutting tool size and hard materials such as nickel alloys, titanium alloys, CMC, etc. Seal slots are generally manufactured by die-sinking EDM (Klocke 2014), using an appropriate rib type electrode (typically graphite) having the negative shape of the cavity to be manufactured. For complicated seal slot sections, such as 'L-seal' or 'H-seal', multiple rib like electrodes are assembled together for die-sinking EDM. Additionally, multiple slots can be machined simultaneously on a single or plurality of components on a machine tool. Despite of its wide use for seal slot machining, there are several disadvantages of the die-sinking EDM process. Narrow and deep slot machining reduces the die-sinking EDM process efficiency, partly due to poor flushing or debris evacuation, which can be partially improved by ultrasonic assisted process (Uhlmann 2016, 2013) or special electrode designs (Flaño 2017, KR20110048720). Another disadvantage of the process is electrode wear, thus electrode must be redressed (Uhlmann 2016, Uhlmann 2016) or replaced from time to time. Yet another disadvantage emanates from the complex slot profiles, which requires either resource consuming electrode machining or electrode setup by assembling different electrodes to machine a complex shaped slot.

EP616868A1 by Bridgestone, discloses a method by which a slot like shape is machined by producing a row of adjacent holes by EDM drilling. In detail, the method forms a deep opening by discharge machining using a stick-like electrode. Then the electrode is retracted, shifted laterally and a next deep opening is formed adjacent to the first one, connecting the preceding opening with the current opening. The operation is repeated a plurality of times, along the required shape to machine a shape like groove.

Compared to the aforementioned die-sinking EDM process, Bridgestone has a big advantage that a simple shape stick-like electrode can be used to machine complex slot like features irrespective of the shape complexity. Also the electrode cost is much lower than for die sinking electrodes. Such method would allow cost efficient machining of complex shaped slots which are often required to increase sealing performance and in turn increase the turbine performance. However, there is need to further increase the efficiency of the method for such applications.

SUMMARY OF THE INVENTION

The present invention in one aspect provides an electrical discharge machining method including the drilling of holes in a workpiece by means of a tubular or stick-like electrode (6), wherein the method comprises drilling holes in at least two different process conditions, wherein first type of holes (1) are drilled into full workpiece material (7), whereby the workpiece material entirely surrounds the circumference of a portion of the tool electrode (6) used for machining hole/deep cavity, and wherein second type of hole(s) (2) is drilled into workpiece material (7) only partially surrounding the electrode (6) circumference, such that the second type hole (2) connects two adjacent first type holes (1) through an opening (2). Furthermore, Electrical discharge machining method characterized in that a slot/groove (5), a cavity (18), or an aperture (17) is machined by drilling of a plurality of holes of first type (1) and by drilling of second type holes (2) between two adjacent holes of first type (1). The method as described above characterized in that the holes are blind holes (14) or through holes (13).

The invention provides a method for machining a shape such as a slot (5) or a cavity (18) or an aperture (17) using a plurality of first type holes (1) and second type holes (2), where in during machining of first type holes (1) the hole circumference completely envelopes the respective portion of the tool electrode (6) circumference, in other words the tool electrode transverse (6) cross section used for machining is completely surrounded by the workpiece material (7); where in during the machining of second type hole(s) (2), the hole circumference only partially envelopes the respective portion of the tool electrode (6) circumference, in other words the transverse cross section of the tool (6) used for machining a hole/deep cavity is only partially surrounded by the workpiece material (7) and partially exposed to at least one first type hole (1); wherein the second type hole (2) at least connects or provides opening to a first type hole (1); wherein two adjacent first type holes (1) are only connected through a second type hole (2) to form a shape; wherein the holes may be blind holes (14) or through holes (13).

Further aspects are set forth in the following description and the drawings. Other features are inherent in the methods and products disclosed or will become apparent to those skilled in the art from the following detailed description of embodiments and its accompanying drawings.

BRIEF DESCRIPTION OF THE DRAWINGS

Embodiments of the invention will now be described, by way of example, and with reference to the accompanying drawings, in which:

FIG. 1 is a representation of three distinct erosion conditions while drilling a hole.

DESCRIPTION OF THE PREFERRED EMBODIMENTS

Figures 1A, 1B, 1C:
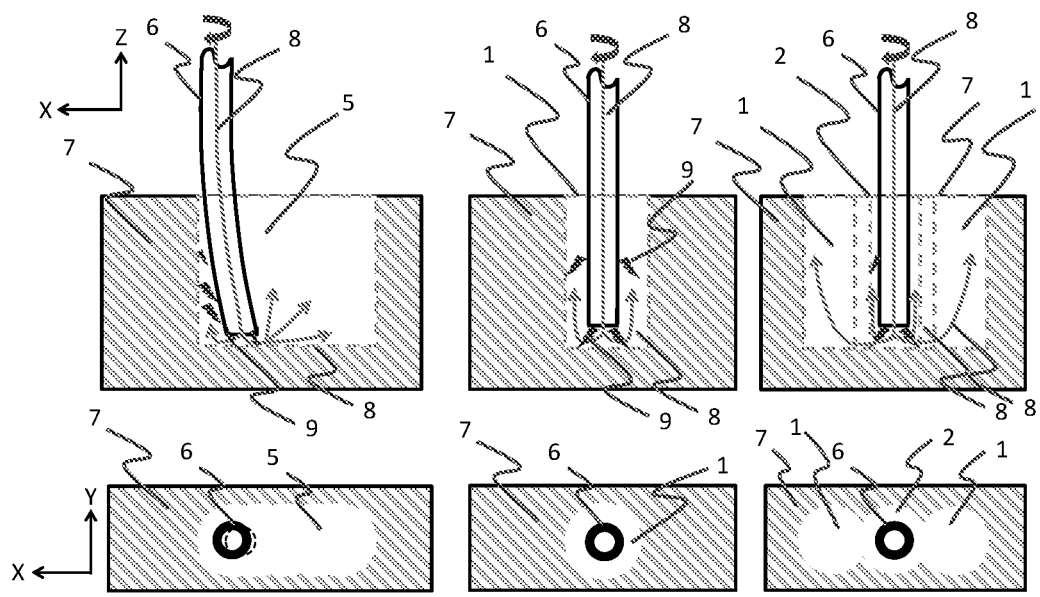
In FIG. 1(a), longitudinal cross section of slot being machined is presented using the Bridgestone method.
FIG. 1(b) depicts the erosion conditions encountered while drilling first type hole (1) and FIG. 1(c) depicts the erosion conditions for drilling second type hole (2) between two adjacent first type holes (1).

According to the EDM method provided in EP616868A1 by Bridgestone, a stick like electrode is used to form a first deep opening, and subsequently making plurality of deep openings by retracting and shifting the tool electrode by a predefined pitch (P) to make another deep opening to connect previously machined adjacent deep opening. Here, by repetitively shifting the electrode position by pitch (P) after retraction and generating plurality of deep openings, a shape such as groove is formed. Accordingly, the subsequent deep opening or hole is machined adjacent to the previous deep opening or hole with some overlap, defined by pitch (P). However, this approach leads to poor erosion conditions as depicted in FIG. 1 (a). Here, a stick-like tool electrode (6) is shown during machining of a slot (5), where the electrode feed (−Z) during drilling is downwards and the next hole position will be on the left of the current position in longitudinal direction of the slot (+X). During the drilling of a hole, one side (−X) of the electrode (6) is exposed to the machined slot (5) or connected deep openings and the other side of the electrode is in contact (+X) with the workpiece material (7) through electric discharges/sparks (9), where majority of the discharges (9) take place. In such condition, at least two inefficient erosion conditions can be observed. Firstly, discharges or sparks (9) occur only on the frontal side and partial circumferential side (+X) of the tool electrode (6). The discharge forces push the electrode away from the workpiece side towards the already machined slot (5) side (−X). Continuously rotating electrode thus vibrates and leads to shorts and inefficient sparking conditions. Also, this phenomenon becomes more prominent while using very thin electrodes, in other words narrow slots and/or for high aspect ratios. Secondly, the dielectric fluid flow (8) (liquid, gas, emulsion, etc.), typically supplied through the inner cooling channel(s) in the tool electrode (6) or supplied co-axially to the tool electrode or supplied by flushing jet(s) around the tool electrode (6) directed towards the hole/deep opening escapes largely towards the already machined deep opening/cavity/slot (5). This non-optimal flushing conditions where the pressure drops considerably at the electrode front reduces debris evacuation from the erosion region and may also lead to lower sparking efficiency. Very fast rotation of the tool electrode (6) may increase its rigidity to reduce the vibrations, but may still lead to non-optimal flushing conditions.

A representation of a more ideal condition for drilling/formation of deep opening is depicted in FIG. 1(b). Here, the electrode (6) circumference is completely and typically symmetrically surrounded by the workpiece material (7). Thus, the sparking takes place at the frontal electrode surface and side surfaces. Such symmetrical condition avoids bending of the electrode towards a particular direction. Also, due to the hole/deep opening (1) being completely surrounded by the workpiece material (7) from the lateral sides (X,Y), flushing flow (8) conditions are better, pressure drop at the erosion front is lower, leading to improved debris evacuation from the erosion region, better cooling and sparking conditions.

In yet another case, depicted in FIG. 1(c), drilling/deep opening formation is performed between two adjacent deep openings/holes (5/1) such that the hole being machined (2) connects the two adjacent holes/deep openings (5/1). In this case, less than optimal conditions are observed compared to the previously described scenario of workpiece material circumferentially surrounding the tool electrode (6). In fact, in terms of sparking, sparks take place at the electrode front and on the partial circumference surrounded by the workpiece material (7). Also, the flushing fluid (8) undergoes higher pressure drop at the electrode front due to fluid escape through adjacent holes/deep openings, apart from the flow ejecting from the hole (2) being machined.

Considering the EDM process efficiency and outputs, namely material removal rate (MRR) and tool electrode wear, one can compare the three above mentioned scenarios depicted in FIG. 1. In the case of the method suggested by Bridgestone, higher electrode vibration and flushing pressure drop is expected compared to the drilling a hole (2) between two adjacent holes. Among the three scenarios, drilling a hole (1) where complete electrode circumference is surrounded by the workpiece material (7) results in better erosion conditions, thus MRR for drilling a hole/deep opening is highest for hole (1) followed by drilling hole (2) connecting two adjacent holes/slots/apertures and the MRR is lowest in the scenario shown in FIG. 1(a).

In terms of electrode wear, except of the initial hole, the holes drilled in the method shown in FIG. 1(a) have more uniform electrode wear for all holes, since almost all the holes have similar erosion conditions. However, since a large part of sparks take place on side surfaces, electrode wear is expected to be high. High lateral wear causing conical shape of the electrode increases the semi-finishing/finishing requirements on the rough machined shape.

Figure 19:
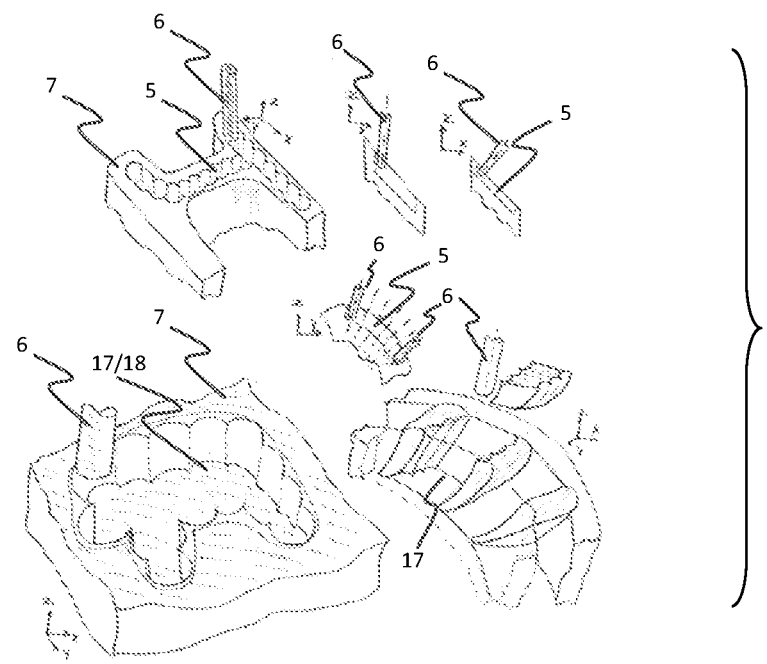
FIG. 19 is a representation of some examples of the application of presented method for slot (5), cavity (18) and aperture (19) like shape machining.

The hole here and henceforth is a simplified representation of deep openings and tool electrode is used for stick-like electrodes. Tool electrode (6) circumference is not defined for the total length of the electrode, but for the portion used for drilling a hole. Also, frontal electrode surface may not be in complete contact with the workpiece material (7) in case of through holes (13) as described later. The tool electrode (6) typically has a tubular or cylindrical shape, thus characterized by outside diameter (10), but may also have other shapes including but not exhaustively, a polygonal cross section, triangular cross section, etc. defined by side dimension (10) and may have equal dimension (10) along the length or may have tape resulting in different dimensions (10). Also, the designation of Cartesian co-ordinates is only provided both in figures and description to increase the clarity of the description, but in no way is limited to the shown directions. In fact XYZ space can be chosen in any suitable manner or at any angle, etc., for example as depicted in FIG. 19.

The present invention in one embodiment from the above described machining conditions and drilling scenarios, provides a method comprising of machining a shape such as slot/groove (5) or an aperture (17) or a cavity (18) using a plurality of first type holes (1) and second type holes (2), where first type holes are drilled such that complete tool electrode (6) circumference used for drilling the hole is surrounded by the workpiece material (7), thus resulting in higher MRR compared to the second type holes (2) and the method described by Bridgestone.

Figure 2:
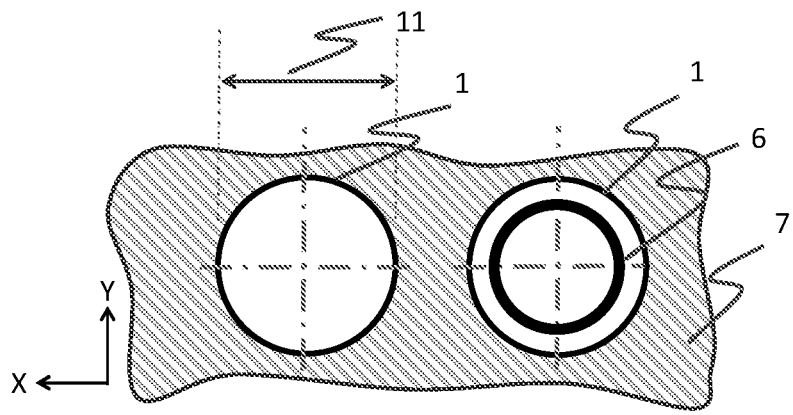
FIG. 2 is a representation of first type of holes (1) drilled in the workpiece (7).
Figure 3:
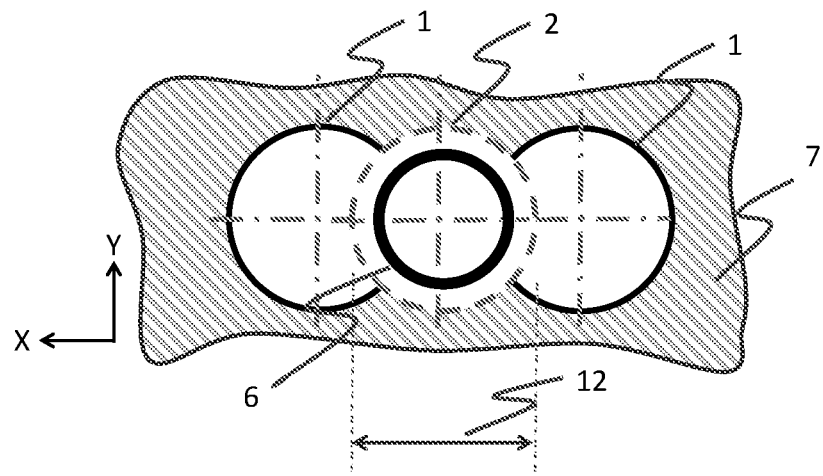
FIG. 3 is a representation of second type of hole (2) drilled into workpiece material (7).
Figure 4:
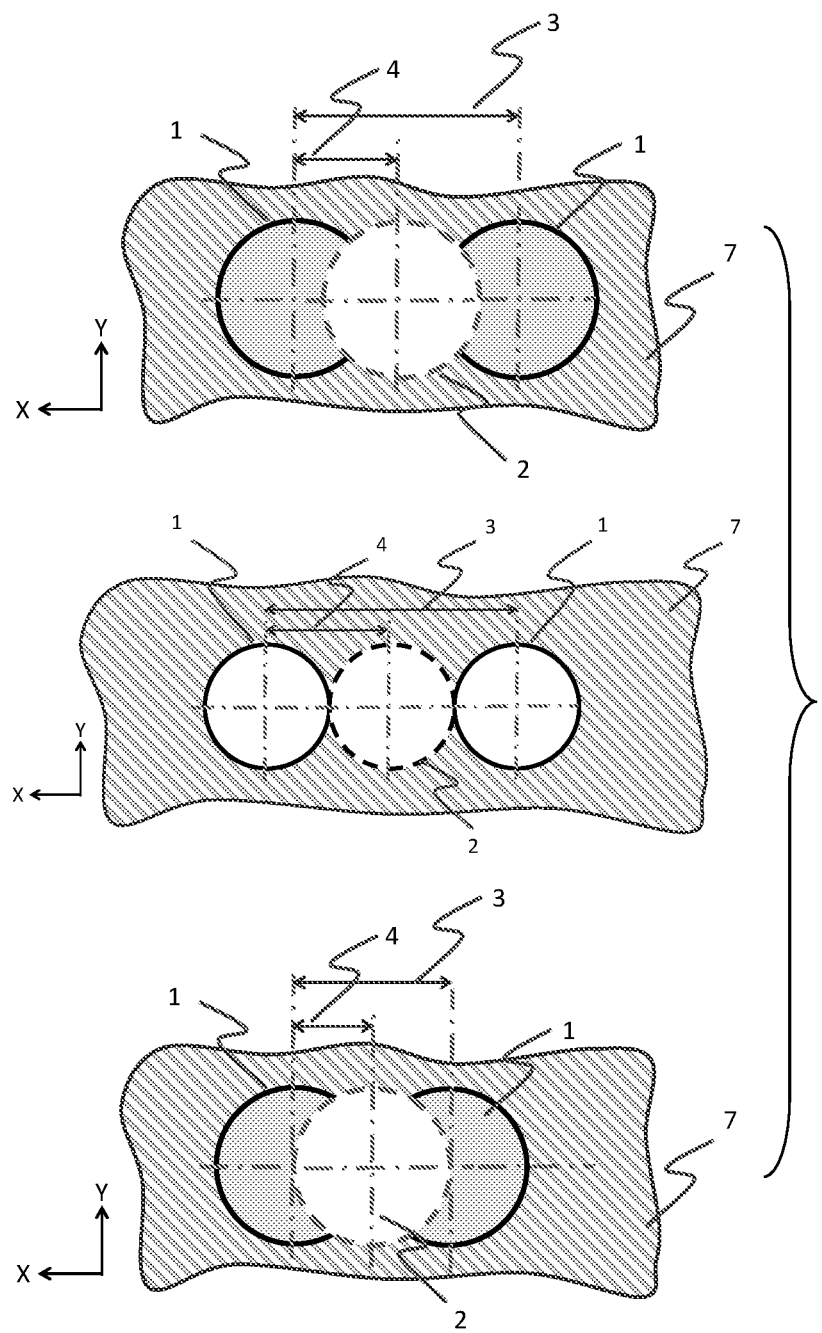
FIG. 4 is different representations of the distance (3) between the central axis of two nearby holes of first type (1) and the distance (4) between the central axis of the first type hole (1) and an adjacent second type hole (2).
Figure 5:
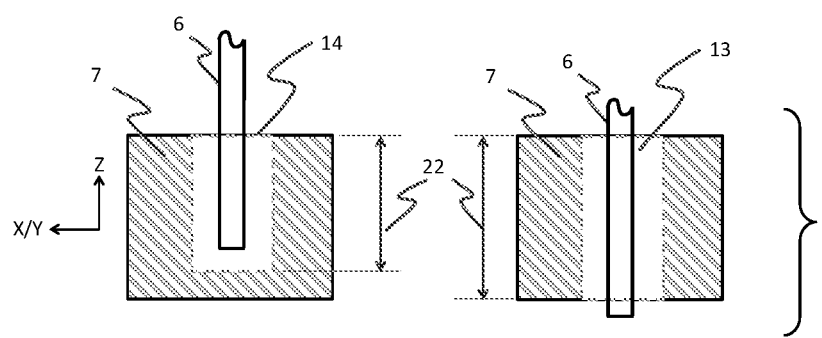
FIG. 5 is a representation of holes characterized as blind holes (14) or through holes (13).

According to an embodiment, the present invention provides a method of forming a shape, such as groove/slot/cavity/aperture, where the first type holes (1) drilled using a tool electrode (6) has diameter (11) slightly larger than electrode diameter (10). Also, during the drilling, within at least one transverse cross section of tool electrode (6), complete circumference of the tool electrode (6) is surrounded by the workpiece material (7). In other words, drilled hole circumference completely envelopes a portion (22) of tool electrode circumference as shown in FIG. 2 and FIG. 5. Thus, erosion conditions similar to that shown in FIG. 1 (b) and described above are expected and utilized to achieve high MRR. Subsequently, tool electrode (6) is retracted from the hole (1) and repositioned at a distance (3) from the central axis of the hole of first type (1), where again a first type hole (1) is drilled. The two first type holes (1) are drilled into workpiece (7) such that they have no overlap, or do not result in even partial opening of the hole side walls, as depicted in FIG. 2. In other words, the central axes of two adjacent first type holes (1) have distance (3) at least slightly larger than diameter (11) of the holes (1) as shown in FIG. 4. At this instance, there are at least two distinct adjacent first type holes (1) which are not connected to form an opening or shape such as slot/groove. Later, as depicted in FIG. 3, a second type of hole (2) having diameter (12) at least slightly larger than tool electrode diameter (10) is drilled between two adjacent first type holes (1), which represents the erosion conditions similar to that depicted in FIG. 1(c), and described above. Using the described method, by utilizing higher MRR from the first hole type (1), the overall MRR for machining a shape such as slot is higher compared to the prior art from Bridgestone method.

Figure 15:
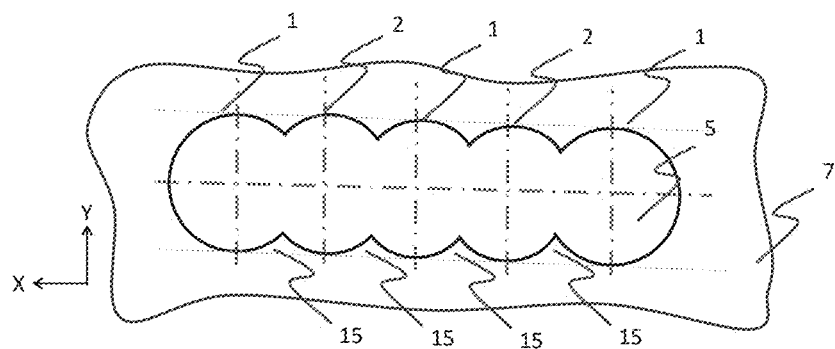
FIG. 15 is a representation of a slot/groove (5) using the provided method and the cusp (15) generated in the workpiece (7) between adjacent holes of first (1) and second (2) type.

According to FIG. 3, during the drilling of a second type hole (2), at least one electrode (6) transverse cross section is only partially surrounded by the workpiece material (7), partially exposed to the previously machined adjacent holes of first type (1), such that it connects adjacent holes (1) through an opening (2). In other words, only partial workpiece material (7) envelops around the segment (22) of the tool electrode (6) used for drilling, and the rest of the circumference of the electrode within the drilling region is exposed to open cavities/deep openings/holes generated previously. Also, a protrusion or cusp (15) is resulted between adjacent first type hole (1) and second type hole (2) as depicted in FIG. 15. The distance (4) between the central axis of the first type hole (1) and second type hole (2) is smaller than the distance (3) between central axis of the two adjacent first type holes (1) as shown in FIG. 4.

In a typical embodiment, the distance (4) between the central axis of a first type hole (1) and a second type hole (2) is set to be a positive value (>0), since the zero value would mean drilling a second type hole (2) at the same location as the first type hole (1) and negative value would mean a positive distance on the opposite side of the first type hole (1) in consideration. The distance (4) is less than the distance (3) between the central axis of two adjacent first type holes (1). Also, distance (4) is not larger than the sum of the half diameter of the first type hole (1) and second type hole (2). Having distance (3) larger than the sum of diameter of two first type holes (1) would mean larger portion of needed machining shape is machined using second type hole (2), resulting in lower MRR or higher machining time. FIG. 4(*b*) depicts a scenario where the distance (3) and distance (4) assume their largest values to maintain high MRR. Depending on the chosen values of distance (3) and distance (4), cusp (15) volume is larger or smaller.

According to an embodiment, the central axis of first type holes (1) and the central axis of the second type holes (2) are parallel to each other.

According to another embodiment, the central axis of first type holes (1) may not be parallel to each other. Similarly, the central axis of the second type holes (2) may not be parallel to each other, or parallel to the first type holes (1), such as in case of machining a slot (5) on a curved surface, as depicted in FIG. 19.

According to an embodiment, during the machining of a slot like shape, the second type hole (2) may not always be between two adjacent first type holes (1), but may be adjacent to only one first type hole (1). In such embodiment, the electrode (6) circumference used for drilling a hole (2) is also only partially surrounded by the workpiece material (7) and connects the hole (2) with the previously machined adjacent first type hole (1), where the distance (4) specifications as described above hold true. Such second type holes (2) may be required to complete a needed geometry, rounding of edges, etc. and may have different hole diameter (12) and/or electrode diameter (10).

Figure 10:
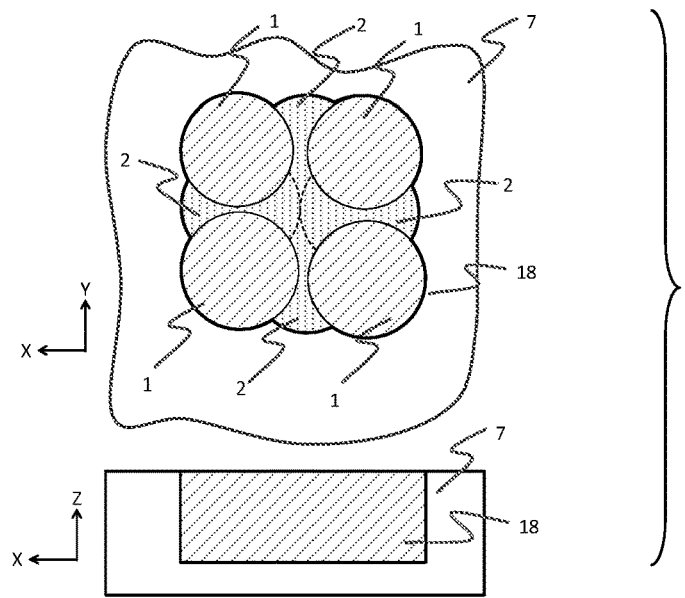
FIG. 10 is a representation of a cavity (18) machined using a plurality of first type holes (1) and second type holes (2), where drilled holes are blind holes (14).
Figure 11:
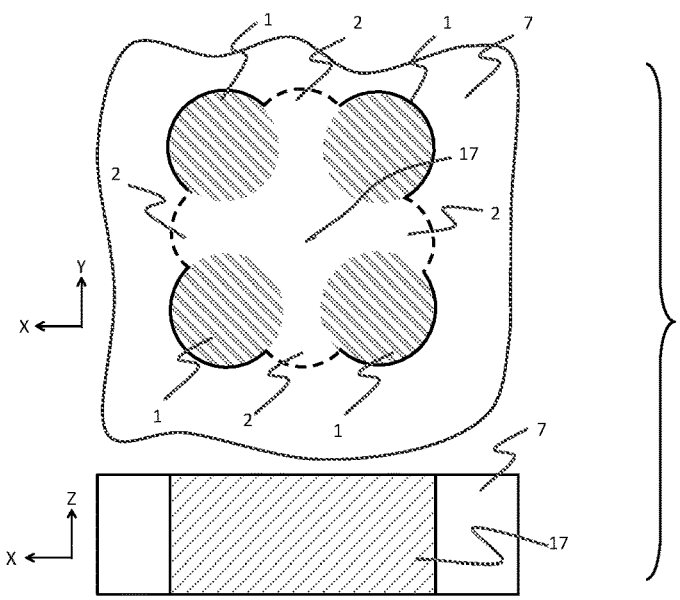
FIG. 11 is a representation of an aperture (17) machined using a plurality of first type holes (1) and second type holes (2), where drilled holes are through holes (13).

As shown in FIG. 5, the holes, both the first type (1) and second type (2) may be blind holes (14) to machine a cavity (18)/slot (5)/groove (5) or through holes (13) to machine a slot type aperture (17)/cut out type aperture (17) or other open cavities or separation (17) of workpiece features or material (7). The depiction of typical slot (5), cavity (18) and apertures (17) is shown in FIG. 6, FIG. 10 and FIG. 11 respectively.

Figure 6:
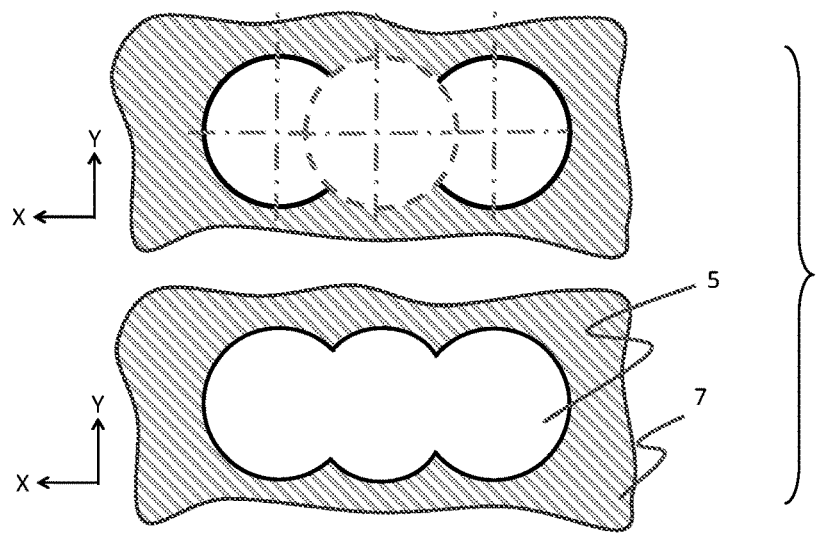
FIG. 6 is a representation of a slot/groove (5) generated by drilling of a plurality of holes of first type (1) and second type (2) holes.

According to an embodiment, by drilling at least two first type holes (1) and at least one second type hole (2), one may achieve a shape like slot (5) in a workpiece (7) as depicted in FIG. 6. The advantage here compared to the prior art of die-sinking EDM is the use of simple stick-like electrode (6) compared to the needed rib like electrode for die-sinking EDM. On the other hand, first type holes (1) contribute to higher overall MRR for the machined shape compared to e.g. Bridgestone method.

Figure 7:
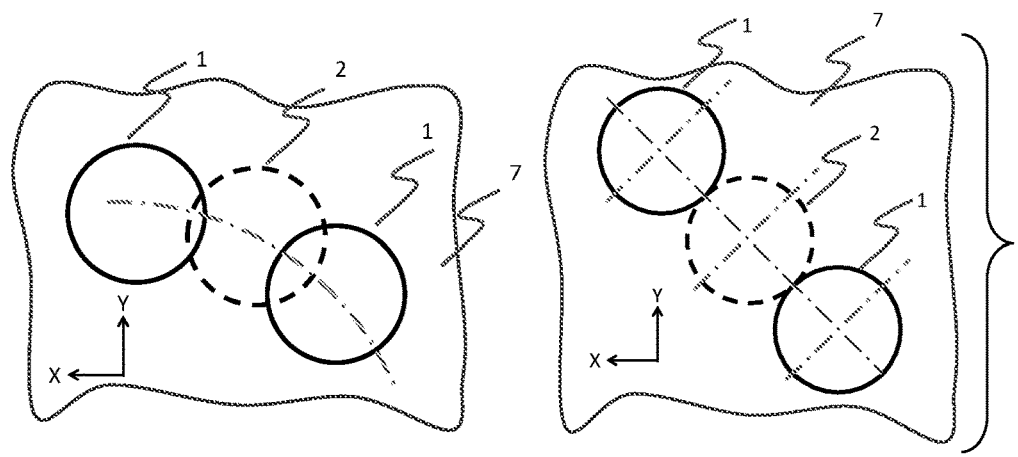
FIG. 7 is a representation of different arrangements of first type holes (1) and second type holes (2) to generate various slot (5) shapes, such as linear and curve/spline.
Figure 13:
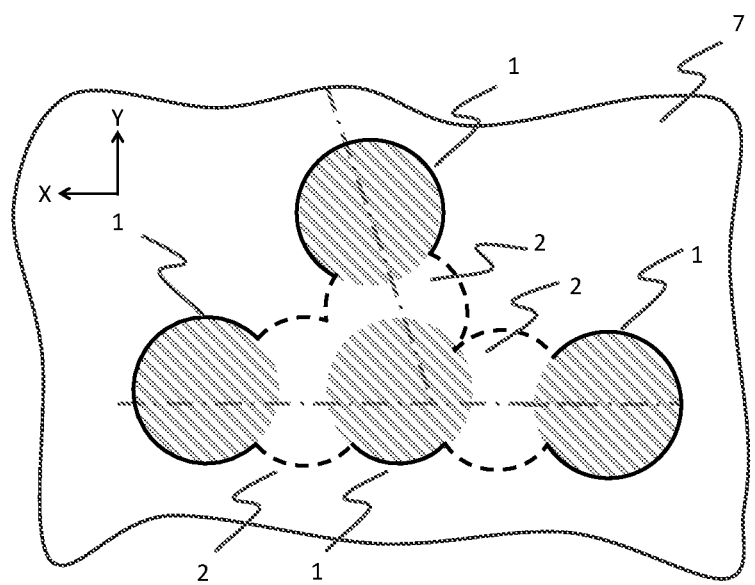
FIG. 13 is a representation in that the machining sequence of drilling of holes takes into account maximum material removal by first type of holes (1) to complete machining of the needed geometry or feature.

According to an embodiment, drilling plurality of first type (1) and second type (2) holes lead to a shape like the slot with cusps (15) shown in FIG. 15. Here, the central axis (X) of a slot (5) passing through the central axes (Z) of first type (1) and second type (2) holes may be a straight line as shown in FIG. 7(*b*), FIG. 15 or curvilinear/spline/corner/angle, for example as shown in FIG. 7*a*, FIG. 13. The ability to flexibly change the slot cross section shape is yet another improvement upon the prior art of die-sinking EDM, where complex electrode shapes need to be machined or assembled in the form of the required slot shape.

Figure 9:
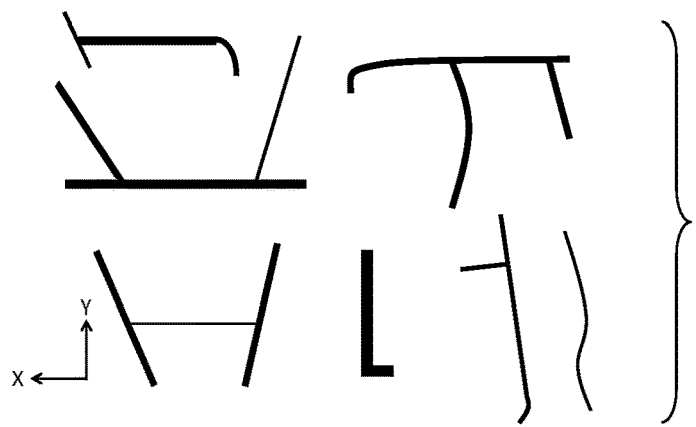
FIG. 9 is a representation of top view of some exemplary configurations of slots (5).

According to an embodiment, slots (5) comprising a plurality of first type (1) and second type (2) holes may have more than one slot axis passing through central axis of holes as show in FIG. 13, where two such slot axes intersect each other at some angle. According to an embodiment, through straight, curved, spline or other shaped slot axes, various slot cross sections can be machined, some examples of which are shown in FIG. 9.

Figure 8:
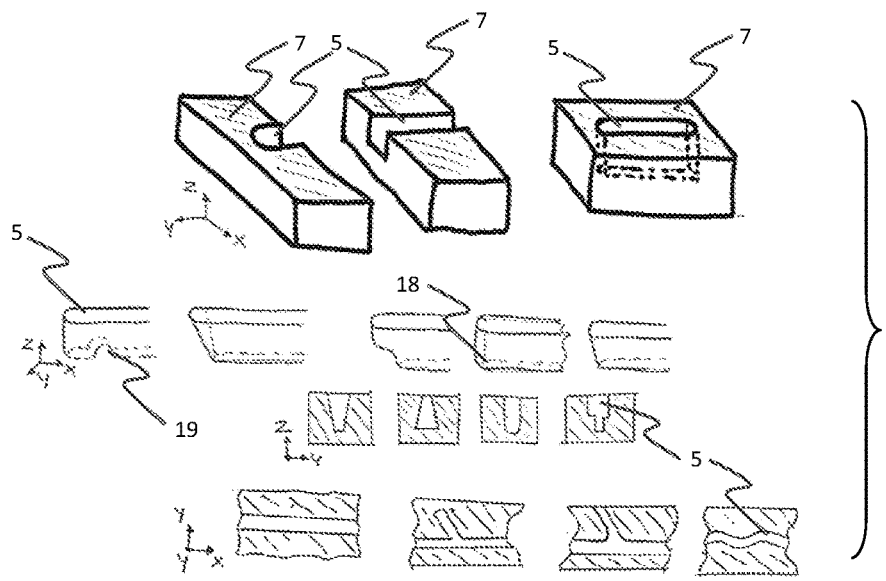
FIG. 8 is a representation of various slot (5) types.

According to an embodiment, the slots (5) machined using a plurality of the first type (1) and second type (2) holes may have different variations in XY/XZ/YZ planes in terms of the slot width, slot depth, slot cross sections, slot angles, slot geometries such as corners, bottom radius (18), etc. as shown in FIG. 8. Additionally in another embodiment, certain first type (1) and/or second type (2) holes may not be drilled to the set depth compared to the rest of the holes of first (1) and second (2) type to create single or plurality of protrusions (19) as shown in FIG. 8), which may be useful to avoid sliding of seal in the machined slot, e.g. during turbine operation due to thermal and mechanical deformations. Also, different electrode dimensions (10) or electrode types can be used to drill first (1) and second (2) type holes within a single geometry or connected holes, forming a shape like a slot/a groove (5).

According to an embodiment, the central axis of the first type (1) and second type (2) holes are perpendicular to the workpiece (7) surface or perpendicular to a feature of the workpiece (7).

According to another embodiment, the central axis of the first type (1) and second type (2) holes may not be perpendicular to the workpiece (7) surface in order to machine slots on an angled workpiece surface as depicted in FIG. 19, or to machine slots with positive or negative draft angles (in ZY plane) as shown in FIG. 8.

According to an embodiment, in a slot (5) comprising various slot features, the intersection of two slot axes may have sharp corners or rounded corners (as shown in FIG. 8) achieved by first type (1) and/or second type (2) holes and/or achieved during semi-finishing and finishing operations.

According to an embodiment, a cavity is generated by drilling an array of blind holes of first type (1) whereas the array includes three or four nearby equidistant holes, and by drilling blind holes of second type (2) between each of said three or four nearby equidistant bores of first type (1), as depicted in FIG. 10. Here, a shape similar to a slot/groove (18) can be generated with width of the slot (5) larger than the sum of the diameter (11) of two first type holes (2), as opposed to shapes like slot/groove (5), where typically the width of the slot is same or larger than diameter (11) of the first type hole (1), but smaller than the sum of diameters (11) of two first type holes (1).

According to an embodiment, polygonal and other shaped cavity (18) can also be machined using a plurality of first type (1) and second type (2) holes. In this case of machining cavities (18), the hole type is blind holes, such that some workpiece material (7) is left at the bottom of the machined hole, as depicted in FIG. 10.

According to an embodiment, similar to the previously described flexibility for slot like shape geometry, similar variations or geometry in terms of cross-sections can be achieved by drilling plurality of first type (1) and second type (2) holes, including taper, etc.

In another embodiment, during the machining of a cavity (18) using a plurality of first type (1) and second type (2) holes, multiple translation and rotational movement of the tool electrode (6) and/or workpiece (7) can be employed to generate cavities with curved surfaces.

As compared to prior art, the embodiments have the advantages such as the use of simple stick-like tool electrode (6) for fast rough machining of a shape and the flexibility of the shape geometry to be machined.

According to an embodiment, an aperture (17) is generated by drilling a plurality of through holes of first type (1) and by drilling of a through hole(s) of second type (2). Here, the machined aperture may have a shape like groove (5), where typically the slot width is similar or larger than the diameter (11) of the first type hole (1), but smaller than the sum of diameter (11) of two first type holes (1).

In another embodiment, an aperture (17) generated using a plurality of first type (1) and second type (2) holes may be like a cavity (18), where the slot width may be even larger than the sum of diameter (11) of two first type holes (1), the difference being the type of hole, where a cavity (18) is machined using primarily blind holes (14); whereas an aperture is primarily machined using a plurality of through holes (13) of first type (1) and second type (2). An example of such aperture (17) is depicted in FIG. 11.

Figure 12:
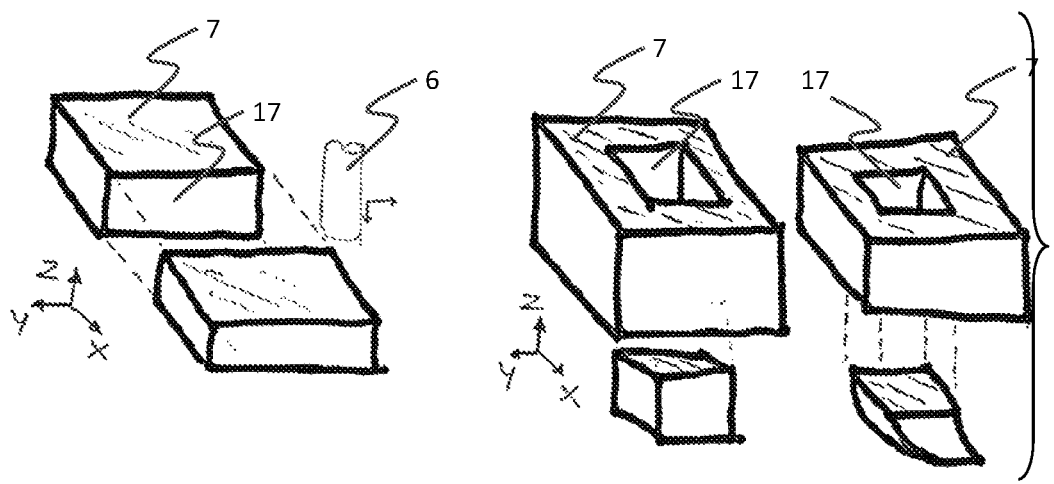
FIG. 12 is a representation of various exemplary apertures.

In another embodiment, an aperture (17) may have different cross section shapes, such as depicted in FIG. 12), but not limited to the depicted cross sections. In fact, cross sections may also look like the shapes of slot (5) depicted in FIG. 9, including various modifications in transverse cross-sections as depicted in FIG. 8.

In another embodiment, during the machining of an aperture (17) using a plurality of first type (1) and second type (2) holes, multiple translation and rotational movement of the tool electrode (6) and/or workpiece (7) can be employed to generate apertures (17) with curved surfaces, as depicted in FIG. 12.

As compared to the prior art such as die-sinking EDM, the embodiments have the advantages such as the use of simple stick-like tool electrode (6) for fast rough machining of a shape and the flexibility of the shape geometry to be machined.

As compared to the prior art such as wire-EDM, the embodiments have the advantages to generate apertures (17) or cut-off piece (17) even where wire cannot conveniently pass through the part being machined, such as for example to remove material in Turbine blisk with curved surfaces, as depicted in FIG. 19.

According to an embodiment, a plurality of first type holes (1) and second type holes (2) can be machined using different sequences, such as first all the first type holes (1) followed by all second type holes (2). According to another embodiment, the sequence of drilling of plurality of first type holes (1) and second type holes (2) may be chosen differently, such as drilling two first type holes (2) followed by a second type hole (2) between the mentioned first type holes (1). In another embodiment, the sequence may be changed according to partial features to be machined, for example in case of 'H-seal' depicted in FIG. 9, at first generation of a horizontal slot, followed by a second vertically inclined slot, followed by the last slot feature may be performed using electrode(s) (6) with same or different diameters (10).

According to an embodiment, a slot (5)/a cavity (18)/an aperture (17) or combination thereof can be machined using a plurality of first type (1) and second type (2) holes, where the sequence of the holes is chosen such as to maximize the material removal by the first type holes (1), or in other words, to maximize the number of first type of holes (1) to complete the shape machining. An example hereto is shown in FIG. 13 where to complete the slot geometry machining, four first type holes (1) are used and three second type holes (2) are used. In this way, high MRR from holes (1) is utilized to decrease overall machining time. By maximizing the number of first type holes (1) the distance (3) between the axis of two nearby holes of first type (1) is minimized, however as mentioned earlier, this distance (3) shall be set such as to avoid any opening of the side walls of the presently drilled first type hole toward a previously machined hole.

According to an embodiment, the optimal sequence of the first type hole (1) and second type hole (2) drilling is calculated using optimization algorithms, such as Bellman-Ford algorithm. In another embodiment, the optimization of machining sequence of a plurality holes of first type (1) and second type (2) includes the information about shape to be machined (5,17,18), used machine tool specifications, such as axes travel, axes travel speed, electrode change time; user preferences and part (7) geometry among others.

According to an embodiment, considering the optimal process outputs for first type holes (1) and second type holes (2), such as MRR, wear, accuracy, etc., the distance (3) between two adjacent first type holes (1) and distance (4) between adjacent first type (1) and second type holes (2) is adjusted. In other words, distance (3) between adjacent first type holes (1) define the amount of material to be removed by the second type (2) hole and the portion of the workpiece material (7) removed by the second type hole (2). Appropriate distances (3, 4) can be thus selected using optimization algorithms, which consider the optimal process outputs concerning second type holes (2) and/or overall geometry of the shape to be machined to achieve high efficiency, e.g. lower overall machining time, including electrode change time, etc.

According to an embodiment, the distance (3) between adjacent first type holes (1) and/or distance (4) between adjacent first type (1) and second type (2) holes is set such that optimal process output as mentioned above is obtained for third type holes (21). Optimization algorithms can be used to choose the optimal distance (3) and distance (4) to achieve overall high process efficiency, e.g. overall machining time.

According to an embodiment, the depth (22) of machined blind hole (14) to machine slot (5) or cavity (18), including electrode wear compensation is set such that optimal process output is achieved during subsequent machining steps, such as finishing using EDM-milling or other methods. Here, optimization algorithms can be used to choose the optimal depth (22) to achieve high overall process efficiency, e.g. overall machining time or accuracy or electrode consumption.

According to an embodiment, mechanical movements of the machine tool axes, such as retraction of tool electrode (6), repositioning of the electrode (6), etc. can be optimized to achieve lower overall machining times.

According to the embodiments, use of such optimization leads to lower overall time for machining the desired shape(s).

Figure 14:
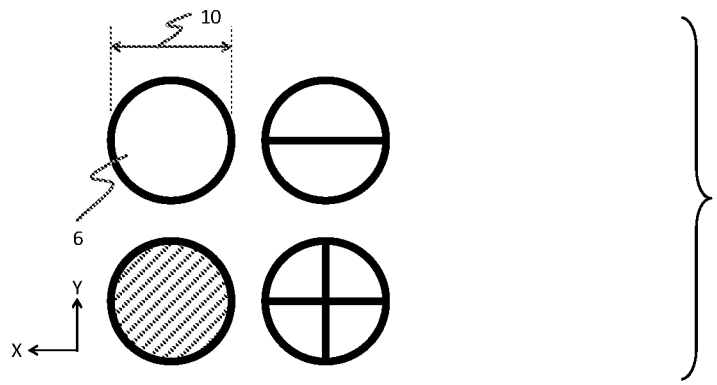
FIG. 14 is a representation of examples of various electrode (6) cross sections.

According to an embodiment, a tool electrode (6) has a tubular shape with diameter (10). In another embodiment, the tool electrode has inner single or a plurality of cooling channel(s) as shown in FIG. 14 to provide flushing fluid/dielectric to the machining region. In another embodiment, tool electrode is a solid bar without internal cooling channel(s). In another embodiment, the out or inner surface of the electrode may have threads for increasing the debris evacuation from the erosion region. Additionally, co-axial flushing may also be applied in a special arrangement of the electrode in order to improve process efficiency. Additionally, electrodes may have a cross-section such as polygonal shape. The electrode may be continuously rotated to increase stiffness and promote homogenous electrode wear. The electrode material may be metallic such as brass, copper, tungsten, silver or non-metallic such as graphite. The lateral electrode surfaces may further have some coating, either for the purpose of coating the machined shape surface(s) or to prevent discharges (9)/machining taking place on the side of the tool electrode (6). In an embodiment, a tool electrode (6) may have multiple layers preferably separated by electrically non-conductive layer, where the outer and inner conductive layer may be subjected to opposite electric polarities to facilitate machining of low electrical conductivity workpiece materials.

According to an embodiment, the workpiece is made of conductive metals or ceramic matrix composites (CMC) or metal matrix composites (MMC) or carbon fiber reinforced polymer (CFRP) or low electrical conductivity materials such as silicon carbide (SiC)/Silicon infiltrated Silicon carbide (SiSiC)/Zirconia (ZrO2) or other materials which can be electrically machined. In another embodiment, low electrically conductive materials may be coated with an electrically conductive layer known as assisting electrode or sacrificial electrode to initiate and continue machining. In another embodiment, the workpiece is a stacked layer, where at least two successive layers are made of different materials, such as aluminum and CFRP sandwich plate or a metallic coating on a different metal alloy components or a ceramic coating on a metallic alloy component, and other such known combinations.

According to an embodiment, dielectric water may be used for EDM or dielectric oil or emulsion may be used for erosion. In an embodiment, gaseous fluid, such as oxygen, air or other mixtures of gases or liquid nitrogen may be used for erosion process. In an embodiment, the used machining fluid may be subjected to pressures above or below atmospheric pressure to increase efficiency of the machining process. In another embodiment, dielectric can be mixed or replaced by an electrolyte for machining.

According to an embodiment, the machining parameters used for the first type (1) and second type (2) hole may be different. As described before and depicted in FIG. 1(b,c), the erosion conditions for the first type (1) and second type (2) holes are different. Thus, to achieve the best possible results, such as MRR, process parameters such as current, pulse duration, pause, etc. may be optimized specifically for the first type (1) and second type (2) holes. Also, second type hole (2) may have different diameter (12) compared to the first type hole (1) diameter (11), in spite of using the same tool electrode (6) diameter (10), due to different erosion conditions.

According to an embodiment, depending on the workpiece material, electrode material, diameter, etc. and workpiece configuration, e.g. for stacked materials, different process parameters may be used for first type hole (1) and for second type hole (2). Also, in case of workpieces such as stacked or multilayered workpieces, during the machining of a hole, during the advancement feed towards depth of the hole, different process parameters may be used. The depth(s) at which the process parameters may need to be changed while machining a hole may be predetermined or may be dependent on the process signals such as open voltage, discharge voltage, current, delay time, ratio of good, bad, short, open sparks, among others.

According to an embodiment, the process parameters may include the discharge energy parameters such as current, pulse duration, but may also include other parameters such as flushing pressure, servo control parameters, electrode advance speed, etc.

According to another embodiment, electrode wear can be compensated while machining first type (1) and/or second type (2) holes. Electrode wear compensation facilitates reaching near desired accuracy of the needed shape through roughing operation and reduces machining requirements for subsequent steps of semi-finishing and finishing.

According to an embodiment, similar to the process parameters, electrode wear compensation can be different for first type (1) and second type (2) holes, depending on the workpiece material, or depending on the workpiece structure such as multilayered or stacked material or electrode geometry such as diameter (10) or machining shape geometry, including inclinations between the electrode central axis and the slot transverse axis.

According to an embodiment, electrode wear compensation can be performed by various methods or combination thereof, such as linear electrode wear compensation where relative tool wear is known or measured during the erosion to further feed the electrode by a certain length to compensate for the electrode wear. Also, electrode wear can be compensated based on counting of number of discharges, with further classification used sometimes, where type of discharges and their relative contribution to the MRR and electrode wear is considered for the electrode wear compensation to reach the desired depth of hole or accuracy of the hole, both vertically and laterally.

According to an embodiment, total electrode length or electrode length is monitored during the machining of holes and/or complete shape and depending on the measured/detected/predicted electrode length, process parameters are adjusted to achieve optimal output, for example, flushing pressure through inner channel(s) in electrode (6) is adjusted as a function of the electrode length.

According to an embodiment, process parameters for different hole types and even during the different stages of drilling a hole (e.g. beginning, middle, end) may be changed or selected differently. In an embodiment, the process parameters and associated electrode wear compensation may be different for blind (14) and through holes (13) for different hole types (1,2).

According to the embodiments, the use of different process parameters depending on hole types, etc. and use of different electrode wear compensation based on hole types, etc. facilitates fast machining of needed shape, lower electrode wear, better geometric accuracy, precision, process stability, lower subsequent processing requirement such as semi-finishing, finishing among others.

According to an embodiment, the cusp (15) generated between two adjacent holes in a machined shape such as slot (5)/cavity (18) or aperture (17) using a plurality of first type (1) and second type (2) holes as depicted in FIG. 15 may be removed using additional movement of tool electrode (6) while machining second type holes (2), such as tool electrode (6) movements in direction (X,Y) perpendicular to the feed direction (Z).

Figure 16:
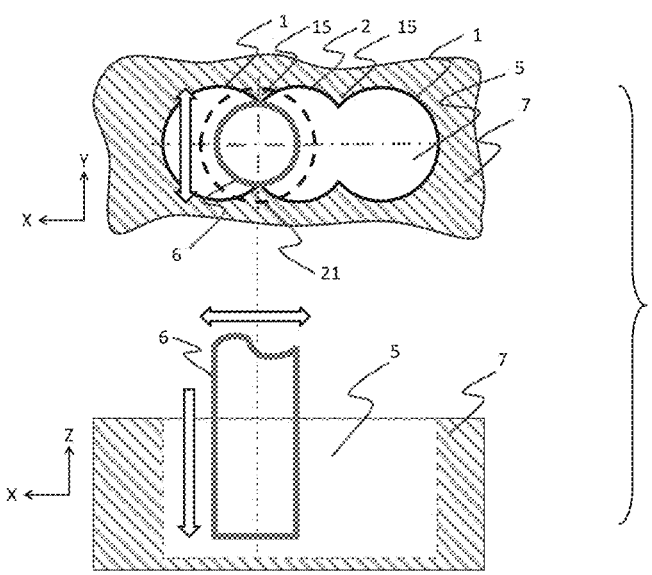
FIG. 16 is a representation of cusp removal process using a second type hole (2) or a third type hole (21) involving the translation movements of the tool electrode (6).

According to an embodiment, the cusp (15) generated between two adjacent holes in a machine shape such as slot (5)/cavity (18) or aperture (17) using a plurality of first type (1) and second type (2) holes may be removed using a third type holes (21) which have the central axis typically aligned to the central axis of the cusp and additional tool electrode (6) movements, translation and/or rotation may be applied in direction (X,Y) perpendicular to the feed (Z) direction, as depicted in FIG. 16. According to embodiments, the use of third type hole (21) or EDM-milling may employ different process parameter sets and electrode wear compensation to achieve optimum results.

According to the embodiments, the additional tool electrode movement in direction (X,Y) perpendicular to the feed direction (Z) and typically the movement along the longitudinal direction of the slot (X) surface may be applied simultaneously while feeding the electrode towards depth or successive to reaching the intended depth of the feed (Z) and then applying the lateral movement(s) (X,Y) either in one or both directions along the slot axis (X). In an embodiment, curvature might be used for the translation movement to remove the cusp if the localized slot surface is not straight, but curvilinear or spline or at some angle.

According to an embodiment, EDM-milling is used for removal of cusps (15) further described below and depicted in FIG. 17 (*a-d*). According to an embodiment, protrusion or cusp (15) removal method can be similar as that described in EP616868A1.

According to embodiments, removal of cusps (15) further reduces or eliminates the need for semi-finishing and finishing operation.

According to an embodiment, the cusps (15) can be removed during the semi-finishing or finishing operation using other methods following by roughing of shape using a plurality of first type (1) and second type (2) holes. Such methods may include EDM-milling, die-sinking EDM, ECM, Laser ablation, etc.

According to an embodiment, EDM-milling may be employed to achieve desired surface quality including surface roughness, geometric accuracy, heat affected zone thickness, specific surface texture or coating after rough machining of shape using a plurality of first type (1) and second type (2) holes, or, first type (1) and second type (2) and third type (21) holes.

Figures 17A, 17B:
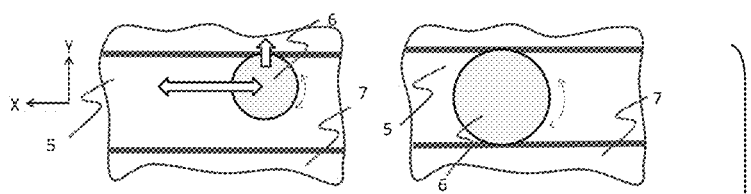
FIG. 17 is a representation of semi-finishing or finishing stages to achieve desired surface quality/roughness/heat affected zone thickness/coating/correction of defects on the surface using a tool electrode (6).
Figures 17C, 17D:
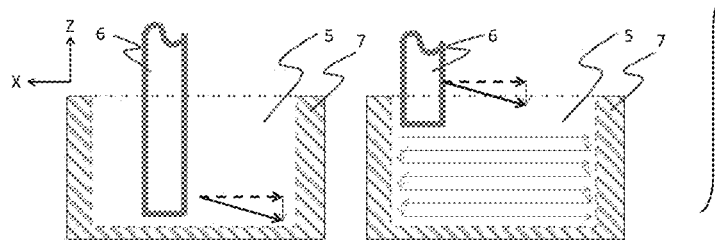

According to an embodiment, the EDM-milling strategy can be chosen, where among others, two main strategies can be chosen as depicted in FIG. 17 (*c, d*). Here, in one method, tool electrode (6) is fed (Z) to the rough machined shape and the electrode is moved along the shape profile (X) while performing machining. Additionally, electrode wear compensation may be employed while performing such machining. Electrode wear compensation method may include one of the methods described above, such as counting discharges and applying a vector based on the relative wear. In such cases, electrode movement is a sum of vector along the shape geometry (X) and downward electrode feed (Z), defined by the relative electrode wear, as depicted in FIG. 17(*c*).

According to another embodiment, as depicted in FIG. 17 (*d*), EDM-milling strategy may follow well known layer-by-layer machining technique for finishing of a shape rough machined using a plurality of first (1) and second (2) type holes.

According to an embodiment, during the semi-finishing and finishing, electrode (6) can be feed towards (Y) the rough machined shape wall in FIG. 17(*a*), along the shape profile (X) and towards the bottom surface of the shape (Z). During the finishing operations, electrode rotation may be applied to improve process efficiency, geometric accuracy of the contour being machined and obtain uniform electrode wear.

According to an embodiment, during finishing using EDM-milling, finishing of side wall, bottom surface, etc. may be machined separately as depicted in FIG. 17(*a*) or simultaneously as depicted in FIG. 17(*b*).

According to an embodiment, after rough machining of a shape using a plurality of first (1) and second (2) type holes, the dimensions of the shape, such as width, length, depth may be enlarged by the finishing operation(s).

According to an embodiment, a tool electrode (6) is made of the material to be coated in a shape surfaces(s) or the tool electrode (6) is coated with a material to be deposited on the shape surface(s). Also, coating material can be supplied in some form in the erosion region to deposit on the shape surface(s) using the machining method, more specifically electric discharges; or a combination thereof.

According to an embodiment, in a pre-existing shape, such as an already machined slot, using tool electrode described above or a method described above, worn-out partial or complete slot is refilled or the slot or shape surface(s) are coated. Subsequent to such coating, a plurality of first (1) and second (2) type holes are machined to create a new shape or a shape similar to the original shape of worn-out slot. The application of such method is especially useful in case of repairing damaged parts or worn out shapes/surfaces. In such cases, the coating material may be similar to the part material or completely different material. Depending on the material used for coating/filling the existing shape, process parameter sets can be adapted for the first (1) and second (2) type holes and subsequent finishing process steps to achieve optimal results.

According to an embodiment, after or during machining a shape using a plurality of first (1) and second type (2) hole and/or after semi-finishing and/or finishing using a suitable method, including the ones described above such as EDM-milling, coating of at least one portion of surface of the machined shape is performed using a special electrode or one of the coating method described above. Such coatings on the side and/or bottom surfaces of a slot improve the life-time of the slot under high thermal, mechanical stresses among others, such as seal slots in turbines.

According to an embodiment, after machining a shape using a plurality of first (1) and second type (2) hole and/or after semi-finishing and/or finishing using a suitable method, including the ones described above such as EDM-milling, texturing of at least one portion of surface of the machined shape is performed using an electrode.

The electrode used for texturing may be similar as that used for rough machining using a plurality of holes or similar as that used for finishing operation(s) or a different type/material. The texturing in this context means altering the surface topology, such as altering the crater shapes, etc., such as altering surface roughness parameters, etc. Application of such textures may be especially useful for easier part ejection in injection moulding or extrusion, etc.

According to an embodiment, process technology parameters used for coating or for texturing may be different than that used for erosion process, and may depend on the materials, surface requirements, etc.

According to an embodiment, during coating or texturing of at least a portion of surface of the machined shape using a plurality of first (1) and second (2) type holes, one of the EDM-milling strategies mentioned above and depicted in FIG. 17 may be used.

According to an embodiment, during the machining of first type holes (1) and second type holes (2), and subsequent machining steps, process signals are monitored, acquired, stored and analyzed. Process signals may include machine periphery signals such as pump pressure, filter conditions, conductivity of the dielectric, etc. Process signals may also include the machine axes signals such as axes (X,Y,Z, . . . ) positions, their velocity, errors, acceleration, etc. Process signals may also include electrical signals such as voltage and current. Process signals may further also include servo regulation signals, etc. Process signals may further also include discharge signals, such as open voltage, positioning voltage, discharge voltage, spark location etc. Process signals may also include classification of sparks such as good sparks, arcs, shorts, open pulses, etc. based on known characterization methods.

According to an embodiment, the process signals monitored and/or stored are analyzed during the machining or post-machining or post machining stages such as roughing, semi-finishing, finishing, coating, texturing, etc.

According to an embodiment, the process signals are analyzed to detect abnormal behavior of process or machine or conditions which may have influence on the machining quality or party quality.

According to an embodiment, the analyzed information from the process signals can be correlated, such as correlation of actual electrode front by considering the electrode feed axis position and predicted or measured electrode wear using various methods.

According to another embodiment, the analyzed process signal information may be used to detect conditions which may lead to defects (16) in the machined shapes, such as arc spots, black spots, cracks, recast layer beyond acceptable level, deposition of material or debris, etc.

Figure 18:
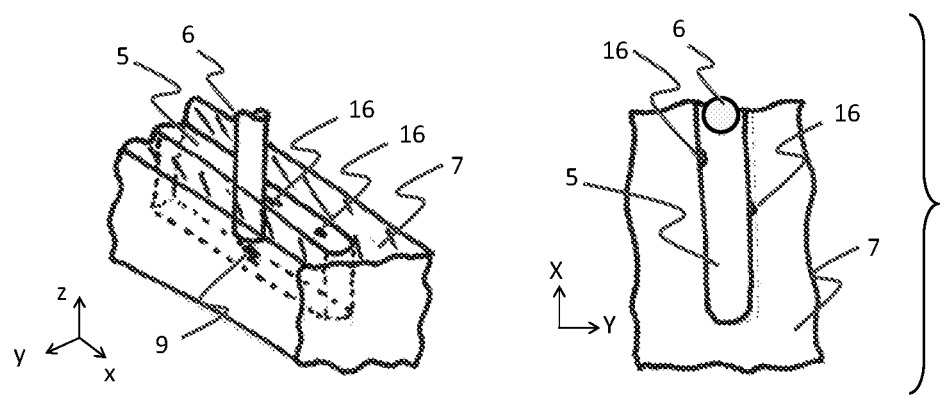
FIG. 18 is a representation in that during drilling of each hole and/or during finishing machining steps the process information is acquired, monitored, stored and analyzed to detect potential defects (16) and is further correlated with the geometric location in machined shape.

According to an embodiment, based on the analysis of the process signals, such as correlation between the instances which lead to defects (16) and actual or predicted electrode position at that instance may be established. Thus, mapping of possible defects (16) in the machined shape or surface may be performed. In other words, potential defects (16) and their location in the machined shape can be identified or predicted, as shown in FIG. 18.

According to an embodiment, based on the analysis of various process signals, potential defects (16) and their location may be supplied to the machine control for further processing. Here, depending on the nature of defect(s) (16) and preferred machining strategy, the defect (16) information including its geometric location(s) can be provided to the machine control, the central manufacturing system control, human operator, etc. for further inspection or further required action or for quality control such as to a metrology instrument or protocol of the machining.

According to embodiments, defects (16) during machining, either while drilling plurality of first type holes (1) and second type holes (2) or further processing such as cusp removal, semi-finishing, finishing, coating, texturing can be identified using the process signals and used for further actions, such as human intervention or further machining adapted to correct such defects. Such in-process quality control, detection of abnormal behavior of machine or process or conditions which affect the machining quality is especially useful for critical components, such as the ones used in aerospace industry or medical industry. In the case of prior art of die-sinking EDM, the process signals can also be monitored and analyzed for defect detection, however in most cases, their correlation to their geometric location in the machined shape is not feasible.

According to an embodiment, using the process signals, the defect(s) (16) detected during the machining of a shape can be corrected by further machining steps, such as EDM-milling, die-sinking ECM, ECM, etc.

According to an embodiment, while correcting the detected or predicted defect(s) (16) using EDM-milling, electrode (6) feed can be increased at and around the defect location or complete surface or shape. In another embodiment, while correcting the detected or predicted defect(s) (16), process parameters can be adjusted at and around the defect location such as to completely or partially remove the defect. For example, discharge energy can be reduced and pause between discharges can be increased to reduce recast layer thickness in the region where defect is predicted/detected.

Figure 20:
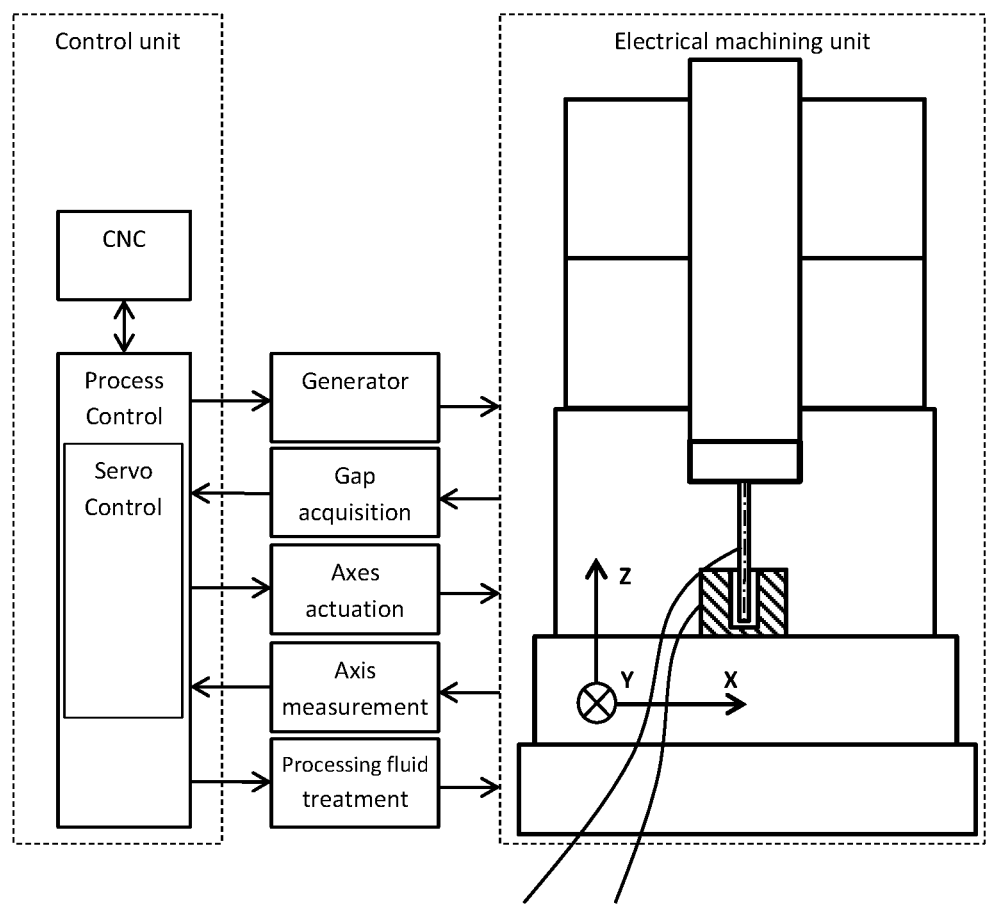
FIG. 20 is a block diagram of an example of an electrical discharge machine for carrying out the teachings of the invention.

The inventive electrical machining method is performed by means of an electrical machining device, typically by means of a machine tool as shown in FIG. 20. Generally the electrical machining device includes the following blocs: an electrical machining unit, a control unit, a generator, a gap acquisition for the acquisition of the process conditions, axis actuation means, axis position measuring means, and a machining fluid treatment unit.

The electrical machining unit generally serves the purpose of holding or fixing the workpiece(s) and/or tool electrode(s) and applying controlled relative motion between the two in order to perform machining. The workpiece(s) and associated fixture assembly is typically fixed or mounted on a table or support structure to position the piece(s) and provide stability against external influences such as vibrations and temperature changes. Machining head typically holds or fixes the tool electrode(s) and related assembly. Motion, typically in machining direction is applied to tool electrode(s) and/or workpiece(s) towards each other to perform machining. Such translator and/or rotary motion can be applied using motor driven axis on which machining head/or workpiece table is mounted, but motion can be also applied by other means. The machine tool for electrical machining may be for instance an electrical discharge drilling machine, such as the AgieCharmilles Drill 300, by GF Machining Solutions.

The electrical machining device may be alternatively realized by a robot arm bearing a modular machining unit, or a machining cell or other configuration including one or more modular machining units.

According to an embodiment, a CAD/CAM system is used to describe the machining and a postprocessor generates the tool electrode (6) and workpiece (7) path, including a suitable machining sequence of first type (1) and second type (2) holes.

According to an embodiment, the machining sequence, either predetermined or determined using optimization algorithms to achieve optimum results, such as lowest machining time or lowest machining costs or such optimization objectives is performed using machine control unit or external control unit, either using local embodiments or remote embodiments.

According to an embodiment, the machining of a series of holes and subsequent finishing operation can be performed using numerical control or manual control. In such embodiments, numerical control contains the movement sequence or machining sequence and/or related machining parameters. In such embodiments, such control is performed by a control unit on the machine or from remote control unit.

According to an embodiment, the machining control which could be also using numerical control, the path of tool electrode(s) and workpiece(s) and machining parameters can be determined using a control unit using local embodiments or remote embodiments.

According to an embodiment, the path of tool electrode(s) and workpiece(s) is generated using a control unit as described above and is stored locally on machining unit or remotely, including contemporary infrastructure offering control and memory storage capabilities such as cloud computing and cloud storage.

According to the mentioned embodiments related to machining unit and control unit, irrespective of their specifics, the unit(s) perform the inventive method of machining a slot (5) or groove (5) or aperture (17) or cavity (18) or other features using the method of using first type holes (1) and second type hole (2).

According to an embodiment, drilling or machining is performed using a machine tool comprising of necessary axes, spindle, electrode and workpiece holders, control unit, memory unit, fluid control unit, etc.

According to an embodiment, electrode is continuously rotated along its central axis, electrode and/or workpiece can be further be rotated along X/Y axes using additional machine axis rotations (A/B). Electrode and/or workpiece can be positioned using translation and rotational movements during drilling and finishing.

According to an embodiment, a control unit such as Computer numeric control (CNC) is used to determine the tool electrode (6) and workpiece (7) paths during machining to complete machining of shape(s).

According to an embodiment, a CAD/CAM system is used to describe the machining and a postprocessor generates the tool electrode (6) and workpiece (7) path, including a suitable machining sequence of first type (1) and second type (2) holes.

According to an embodiment, machine tool may have multiple spindles/drives/tool holder(s), etc. to simultaneously drill holes. In such embodiment, one variant can be simultaneously machining all required or partially required first type holes (1), followed by simultaneously machining second type holes (2). Using this approach machining time can be reduced further, however setup time of electrodes increases. In another embodiment, a machine tool may have multiple electrodes which in parallel perform machining on a single or multiple parts. In one embodiment, a machine tool may perform EDM drilling and die-sinking EDM and/or EDM milling and/or other machining process without or with some adjustment to the machine configuration. Such machine tool has many advantages including lower footprint in the production, lower error on parts since parts do not need to move to other machine tool/setup, lower production times, resources, etc.

The invention has been described in detail with reference to an electrical discharge machining (EDM) process. However, the described method of using a plurality of first type holes (1) and second type holes (2) to machine a shape can be also used for other electrical machining processes such as Electric chemical machining (ECM), Electro chemical discharge machining (ECDM), Electrolytic machining (Bluearc), high speed EDM process (BEAM), Shaped Tube Electrolytic Machining (or STEM), moving arc EDM, etc., where generation of first type holes (1) have considerable advantage for machining conditions and/or process outputs such as machining time or accuracy. As a concrete example, in case of ECM, continuously supplying fresh electrolyte or filtered electrolyte or electrolyte less affected by the machining, similar to flushing of dielectric in EDM allows for stable machining and ability to apply higher current for faster machining. Referring to FIG. 1, it is obvious that by machining a shape using the plurality of holes distinguished as first type (1) and second type (2) provides obvious advantage of flushing of electrolyte in the machining region, thus increasing the efficiency of the ECM process. Thus, according to certain embodiments, the method of machining a shape using a plurality of holes distinguished as first type (1) and second type (2) is not limited to electric discharge machining method, but is applicable to any machining process which have an advantage of using such strategy, such as better flushing, lower tool vibration/bending, etc.

The invention claimed is:

1. An electrical machining method for forming a slot in a workpiece by means of a tool electrode, where the tool electrode is a stick electrode, wherein the method comprises electric discharge drilling holes in at least two different process conditions:
   wherein first type holes are non-interconnected and have their entries in the same workpiece surface;
   wherein the first type non-interconnected holes are drilled into full workpiece material by electrical discharge machining with the tool electrode that is configured to electrically erode the workpiece material, the full workpiece material being a location on the workpiece material that has not been previously drilled, including along the depth of the workpiece, whereby the workpiece material entirely surrounds the radial circumference of an entire length of the tool electrode, and
   wherein a second type hole is drilled by electrical discharge machining with the tool electrode parallel to the first type of holes into the workpiece material partially surrounding the tool electrode radial circumference, such that the second type hole connects two adjacent first type holes along the entire length of the holes,
   wherein the holes are blind holes or through holes; and
   wherein the central axes of the first type holes and the central axis of the second type hole are parallel to each other.

2. The electrical machining method according to claim 1, wherein a distance between the axes of said two non-interconnected first type holes is set such that it is larger than the diameter of the first type holes.

3. The electrical machining method according to claim 1, wherein a distance between the axes of said two non-interconnected first type holes is set such that:
   it is smaller than twice the diameter of the first type holes, or
   it is smaller than the sum of the diameter of the first type holes and the diameter of the second type holes.

4. The electrical machining method according to claim 1, wherein the slot is generated by forming a plurality of blind first type holes and by forming blind second type holes between said two non-interconnected first type holes.

5. The electrical machining method according to claim 1, further comprising forming an array of blind first type holes whereas the array includes three or four equidistant holes, and by forming blind second type holes between each of said three or four equidistant first type holes.

6. The electrical machining method according to claim 1, wherein an aperture is generated by forming a plurality of through first type holes and by forming through second type holes between said first type holes.

7. The electrical machining method according to claim 1, wherein a sequence of forming of holes, or the distance between the central axes of said two first type holes, or the distance between the central axis of one of the first type hole and an adjacent second type hole, is predefined or determined using at least one optimization algorithm.

8. The electrical machining method according to claim 1, wherein a predefined sequence of forming of holes takes into account a maximum number of first type holes to complete the needed slot geometry or a feature of the geometry.

9. The electrical machining method according to claim 1, wherein the first type holes are produced by using a first machining parameter set and that the second type holes are produced by using a second machining parameter set.

10. The electrical machining method according to claim 1, wherein a parameter set of either type of holes have subsets for multilayered or composite materials.

11. The electrical machining method according to claim 1, wherein second type holes or third type holes that are performed to remove generated cusp between successive holes includes tool electrode movements direction perpendicular to the feed direction.

12. The electrical machining method according to claim 1, wherein a parameter set for each type of hole includes suited values of electrode wear compensation.

13. The electrical machining method according to claim 1, wherein at least one finishing machining step is applied, whereas the at least one finishing machining step comprises one or more of: EDM milling, EDM die sinking, third type drilling holes, and a lateral machining.

14. The electrical machining method according to claim 1, wherein after roughing using the drilling of holes, a special material electrode is used to coat the side walls of the machined aperture, cavity, slot or groove.

15. The electrical machining method according to claim 1, wherein during forming of each hole or during a finishing machining step a process information is stored and is correlated with the geometry location and depth information.

16. The electrical machining method according to claim 1, wherein defects generated during roughing and semi-finishing operation are corrected by a parameter set and lateral machining.

17. The electrical machining method of claim 1 wherein the method further comprises:
 storing and analyzing process signals during forming of holes to detect defects in the workpiece; and
 removing the detected defects.

* * * * *